July 28, 1925.
E. BROWN
1,547,896
SHINGLE MARKING MACHINE
Filed Dec. 27, 1924
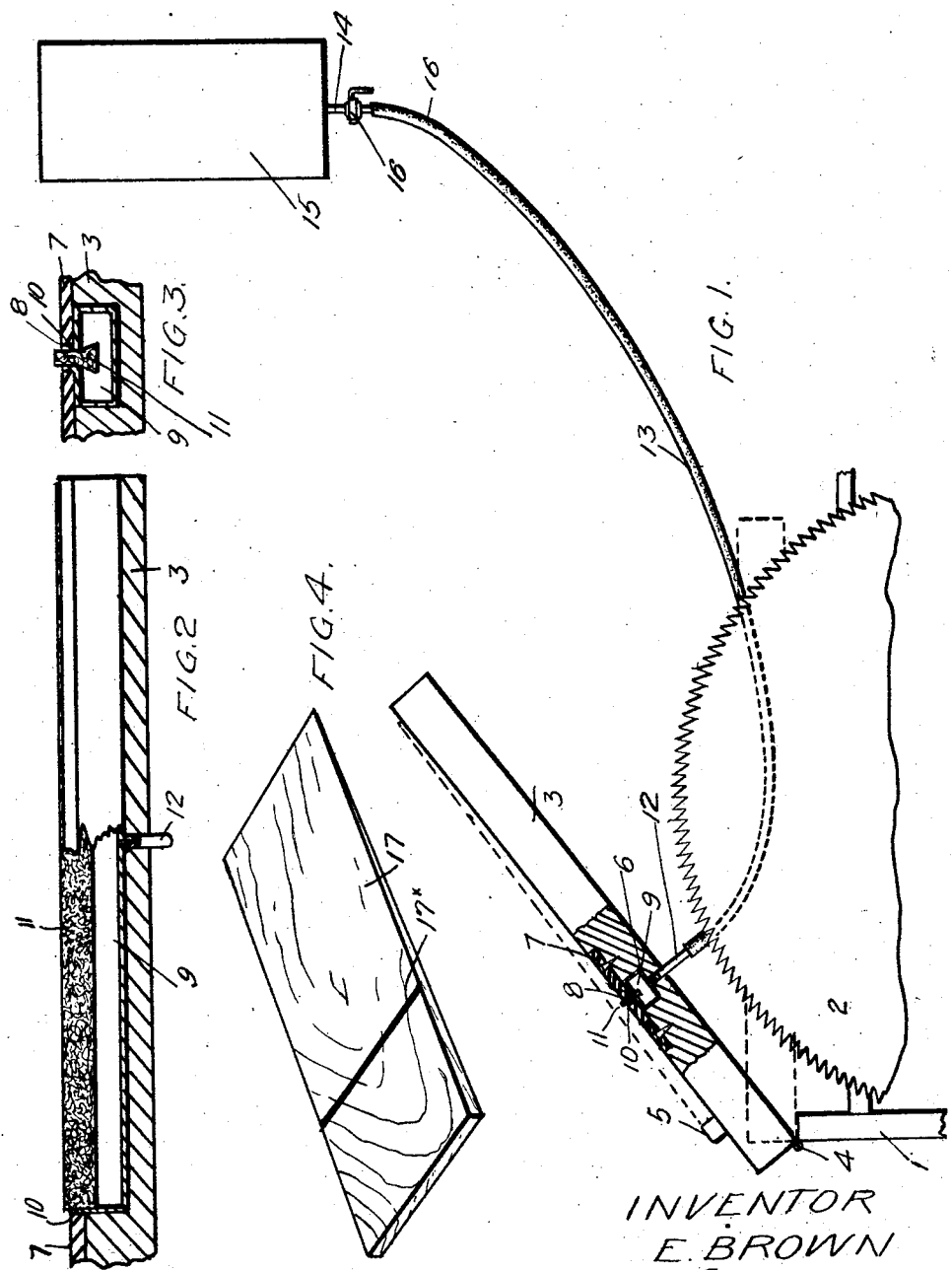
INVENTOR
E. BROWN
BY
ATTORNEYS Patented July 28, 1925.

1,547,896

UNITED STATES PATENT OFFICE.

EZRA BROWN, OF WATERLOO, ONTARIO, CANADA.

SHINGLE-MARKING MACHINE.

Application filed December 27, 1924. Serial No. 758,472.

*To all whom it may concern:*

Be it known that I, EZRA BROWN, a subject of the King of Great Britain, and a resident of the town of Waterloo, in the county of Waterloo, in the Province of Ontario, Canada, have invented certain new and useful Improvements in Shingle-Marking Machines, of which the following is the specification.

My invention relates to improvements in shingle marking machines, and the object of the invention is to devise a simple device whereby shingles may be marked automatically with a transverse indicating mark simultaneously with the operation of trimming the shingle, and it consists essentially of the arrangement and construction of parts hereafter more particularly explained.

Fig. 1 is a side elevation of a portion of a saw table and saw showing my device applied thereto.

Fig. 2 is an enlarged detail partially in elevation and partially in section of my feeding tank and marking wick, and the recessed table in which it is supported.

Fig. 3 is a cross sectional view through Fig. 2.

Fig. 4 is an enlarged perspective detail of a shingle showing the indicating mark thereon.

In the drawings like characters of reference indicate corresponding parts in each figure.

In shingles it is convenient to have an indicating mark extending transversely of each shingle intermediately of its length to indicate exactly where the lower edge of the next adjacent tier of shingles is to be placed during the operation of shingling a roof, as indicated in Fig. 4 of the drawings, in which 17 indicates the shingle and 17$^x$ the indicating line, so that each tier may be placed in proper alignment.

In order to carry out this operation automatically with the operation of trimming the shingle, I have provided the following device.

1 indicates a portion of the frame of a shingle trimming machine, provided with a saw 2 and a saw table 3 which is swingably mounted at 4 in the usual manner and is supported in any convenient way commonly employed so that when the shingle is placed upon the saw table its lateral edge overhangs the edge of the table and is carried down into engagement with the saw by the depression of the table, and the edge portion of the shingle trimmed off.

5 is a stop rib secured to the table 3 in proximity to its lower end.

6 is a channel formed in the table intermediately of its height and 7 is a plate recessed into the table so as to form a cover for the channel 6.

The plate 7 is provided with a longitudinal slot 8 for a purpose which will hereafter appear.

9 is an ink feeding tank provided with a longitudinal slot 10, see Fig. 3, in which is secured an absorbent wick 11 which protrudes outward from the mouth of the slot 10 and depends inward into the feed tank 9 into which ink is conducted by a feed pipe 12 connected by a flexible rubber pipe 13 to a pipe 14 leading from the supply 15 which contains a supply of liquid marking ink.

16 is a valve for controlling the flow of ink through the pipes 14, 13 and 12 into the feed tank 9.

As will be readily seen from Fig. 1, the wick 11 protrudes slightly above the surface of the table 3 and as the shingles are placed upon the table against the stop rib 5, as indicated by dotted lines in Fig. 1, they are pressed against the protruding edge of the wick 11 by the hand of the operator as he forces the table 3 down into the cutting position, and thereby marks a line upon the shingle by the ink impregnated wick, thereby providing an automatic means whereby the shingle is provided with a marking line.

From this description it will be seen that I have devised a very simple device whereby shingles are provided with transverse marking lines which are automatically marked thereon during the operation of trimming off the shingle edge.

What I claim as my invention is:

1. In a shingle marking machine, the combination with a saw table and saw, means for depressibly carrying the saw table, and means for automatically marking the shingle with a transverse indicating line as the shingle placed upon the table is carried into cutting engagement with the saw by the depression of the table.

2. In a shingle marking machine, the combination with a saw and depressible saw table on which the shingle is to be placed to be carried into cutting engagement with the saw by the depression of the table, of an absorbent wick carried by the table transversely thereof, and means for feeding liquid ink into the wick.

EZRA BROWN.